(No Model.)
A. CARDOSO DE LOS RIOS.
FILTER.
No. 312,187. Patented Feb. 10, 1885.
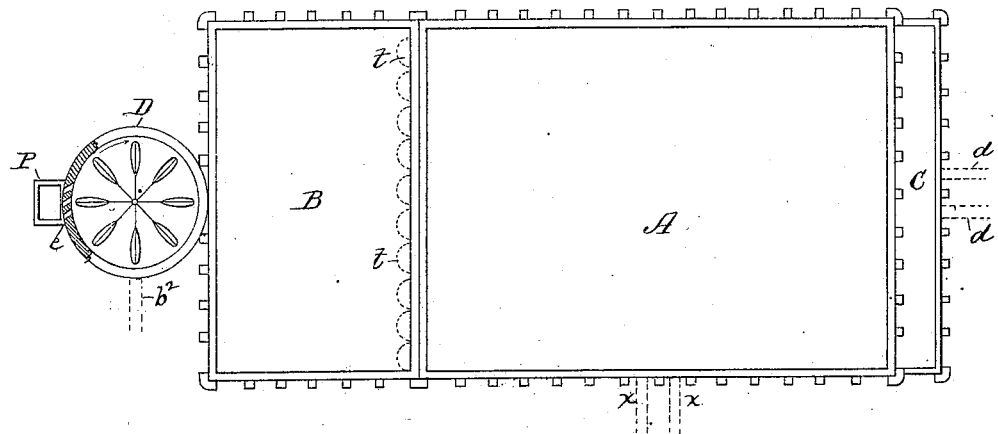
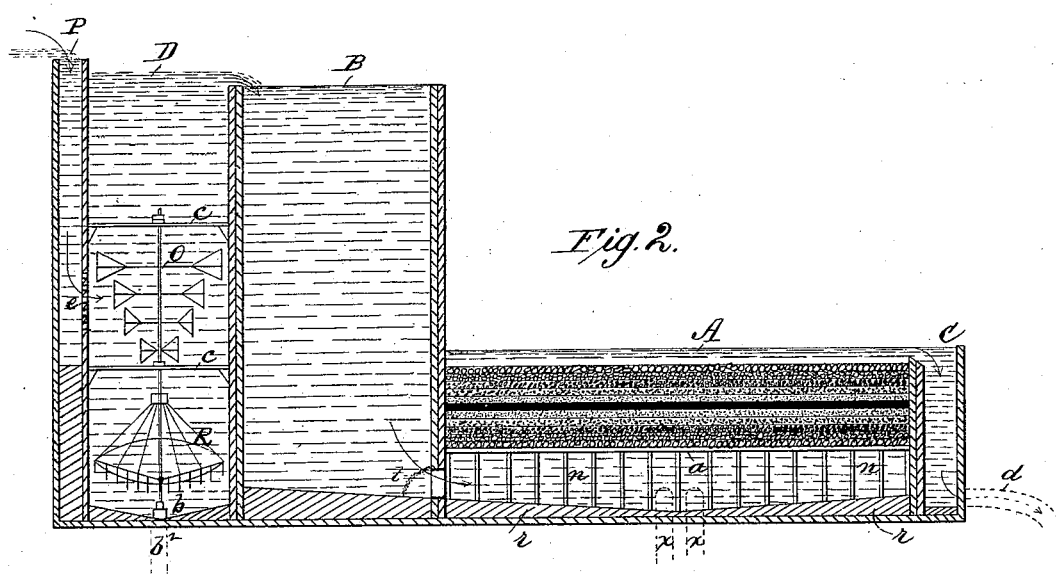
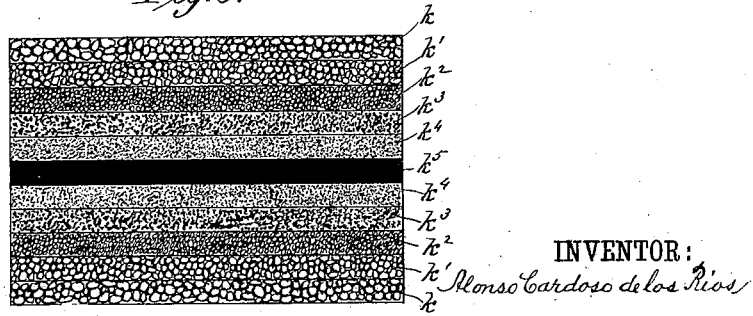
WITNESSES:
W. W. Hollingsworth
Edw. W. Byrn
INVENTOR:
Alonso Cardoso de los Rios
BY Munn & Co.
ATTORNEYS.

UNITED STATES PATENT OFFICE.

ALONSO CARDOSO DE LOS RIOS, OF NEW ORLEANS, LOUISIANA.

FILTER.

SPECIFICATION forming part of Letters Patent No. 312,187, dated February 10, 1885.

Application filed June 9, 1884. (No model.)

*To all whom it may concern:*

Be it known that I, ALONSO CARDOSO DE LOS RIOS, a citizen of Spain, residing at New Orleans, in the parish of Orleans and State of Louisiana, have invented certain new and useful Improvements in Filters, of which the following is a description.

Figure 1 is a plan view as seen from the top, also showing the frame-work of the same. Fig. 2 is a vertical central longitudinal section. Fig. 3 is an enlarged view showing the stratification of the filter.

The object of my invention is to provide means for the extensive filtration of water for furnishing large cities with an abundant supply of pure water; and to this end my invention consists in the peculiar construction and arrangement of the filtering apparatus, which I will now proceed to fully describe.

In the drawings, A represents a section of the filter, which is in nature of a large open tank having in the same a number of layers of filtering material, $k$ $k'$ $k^2$ $k^3$ $k^4$ $k^5$, of which $k^5$ is in the middle, and is composed of cedar-charcoal; $k^4$, of fine sand; $k^3$, large sand; $k^2$, stones; $k'$, larger stones, and $k$ still larger stones. These layers rest upon the false bottom $a$ of the tank, which false bottom is in the nature of an iron grating, and is sustained upon vertical granite columns $n$, which form a chamber below the bottom $a$, for the water which, partially freed from sediment by centripetal action of the wheel O, passes from this subjacent chamber upward through the filtering-layers $k$, &c.

B is the main chamber for the water, which is in the nature of a tank of about twice the height of tank A, and with which it communicates through arched strainers or diaphragms $t$ at the bottom.

D is the chamber in which the water to be filtered is first received and violently agitated by an anti-centrifugal motion, by which a large part of the argillaceous matter contained therein is deposited in the bottom of said chamber, and removed from time to time through an outlet at $b^2$. This chamber D delivers its water at the top into chamber B, and receives its water from conduit P, into which water is delivered from the water mains or pipes.

Between the conduit P and the chamber D there is communication through the holes $e$, which are arranged obliquely in the dividing-wall, so as to deliver the water to chamber D obliquely against the agitating-wheel O, which revolves from the force of the water in the direction of the arrow. The shaft of this wheel is stepped in a bearing, $b$, below, and is guided by bearings in cross-beams $c$ $c$ above.

C is the chamber which receives the completely-filtered water, and which is located at the end of the tank A, and receives water therefrom at the top, and from which chamber C the pure water is conveyed away by distributing-pipes $d$ $d$.

In the sides of the tank A are doors or openings $x$ $x$, for cleaning out the sediment from the chamber beneath the floor $a$ of the filtering-chamber, the bottom $r$ of the subjacent chamber being inclined toward the doors $x$ to facilitate this operation.

In the operation of the filter the water entering conduit P passes obliquely through holes $e$, and, striking the wheel O, causes it to revolve and agitate the water without centrifugal action, and to deposit its sediment. The water then rising flows over into chamber B, and as this is of greater altitude than tank A the water passing beneath the filter $k$ $k'$, &c., issues upwardly through the same with considerable pressure, leaving its sediment in the subjacent chamber, and, rising to the top, flows over into the chamber C.

R is a rake which is temporarily fastened to the shaft of the wheel O, as shown in Fig. 2, when it is desired to stir up the mud in the bottom of this chamber for cleaning out the same.

Having thus described my invention, what I claim as new is—

1. The combination of the tank D with agitating-wheel, the tank B, and the filtering-tank A, made of less altitude than B, and having a subjacent chamber communicating with chamber B at the bottom, as and for the purpose described.

2. The agitating-chamber D, having water-conduit P, with obliquely-directed water-passages $e$, and the rotary agitator O, combined substantially as shown and described.

ALONSO CARDOSO DE LOS RIOS.

Witnesses:
FRANCISCO ROQUERO,
G. T. McCUNE.